Oct. 11, 1927.
R. F. CAREY
1,645,371
HYDRAULIC POWER TRANSMISSION APPARATUS
Filed April 29, 1925
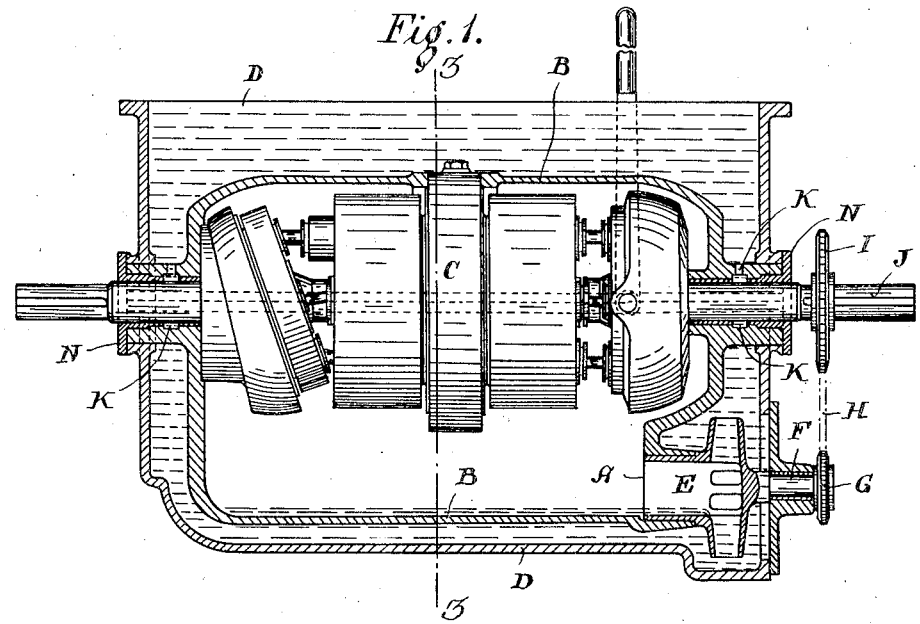
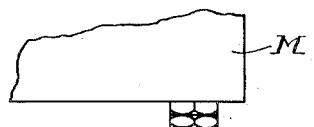
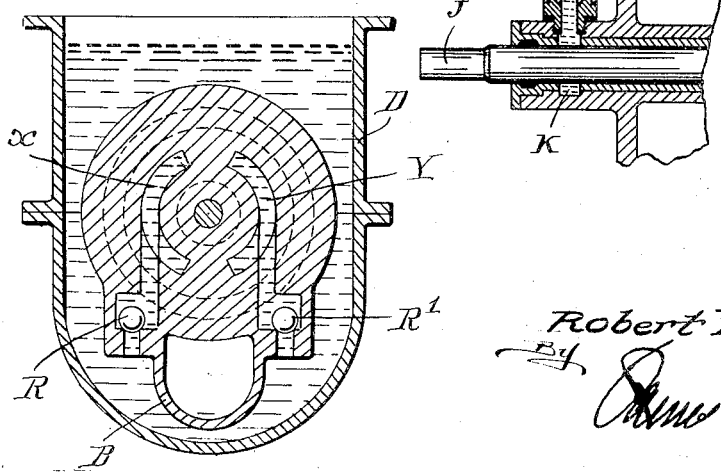

Patented Oct. 11, 1927.

1,645,371

UNITED STATES PATENT OFFICE.

ROBERT FALKLAND CAREY, OF LEIGH-ON-SEA, ENGLAND.

HYDRAULIC-POWER-TRANSMISSION APPARATUS.

Application filed April 29, 1925, Serial No. 26,722, and in Great Britain May 8, 1924.

This invention relates to that class of machines used for transmitting power by means of a liquid under pressure, in which cylinders containing pistons rotate or are rotated within a casing.

These machines may be pumps, engines or a combination of the two, that is a pump which supplies liquid under pressure to an engine, known as a hydraulic transmission gear.

The objects of my invention are, first, to allow the apparatus to be run efficiently at higher speeds than at present and to develop greater power for a given machine; second, to increase efficiency by removing the cause of loss of power; third, to prevent heating of the working medium and the machine generally; fourth, to decrease loss from leakage and therefore to give greater delicacy of control; fifth, to prevent the possibility of air mixing with the liquid medium; sixth, to ensure good lubrication of the shaft bearings and to keep the same cool.

My invention is applicable to hydraulic machines working with any suitable liquid medium, but is especially applicable to that class of machines used for power transmission by means of oil under pressure in which the pistons usually are not packed, good fits of the pistons in the cylinders being relied on to maintain tight joints. In the following description when I mention oil, it must be understood that I refer to oil or any other suitable liquid medium.

In machines of this character, as at present constructed, the casings are usually filled with a liquid medium but sometimes the casings are air filled.

Both methods are open to objection. If the casing is filled with liquid the speed at which the machine can be efficiently run is limited owing to the loss due to churning the liquid and consequent heating as the speed at which the machine is run is increased.

The loss from churning is at present regarded as a necessary evil, the objection being less than if the casing were air filled in which latter case other difficulties arise. The speed is consequently restricted for practical purposes. When the liquid lost becomes replaced with air, the liquid remaining is flung through the air in the casing producing an elastic mixture of air and oil unsuitable for hydraulic transmission purposes.

Again, if any part of the apparatus falls below atmospheric pressure, there is a tendency to suck in air with a similar result.

My invention provides means for exhausting the casing of air so that a vacuum, or practically a vacuum, is formed and maintained in the casing when the machine is working, thus allowing the cylinders, pistons and other revolving parts to work free of any liquid churning resistance, except that due to circulating the liquid in the working system itself. The possibility of air mixing with the working medium or entering the casing and destroying the vacuum is avoided by sealing all places where air might enter with the liquid medium itself so that only liquid can enter the casing. The term "vacuum," as used herein, is to be understood as including an exhausted space, even although vapour from the liquid medium may exist therein.

In the accompanying drawing, Figure 1 is a view in elevation of a transmission power apparatus within a casing which is enclosed within a tank filled with liquid, the casing and tank being shown in section.

Figure 2 is a view of a sealing means connected with a reservoir.

Figure 3 is a section through Figure 1 on the line 3—3.

In carrying my invention into practice I provide an outlet passage A at the lower portion of the casing B through which the liquid in the casing B in which the mechanism C is situated (the casing being filled with liquid at first) may flow by its own gravity when the pressure of the atmosphere is removed or neutralized so as to form a vacuum in the casing B where the cylinders revolve. Means are provided for removing or neutralizing atmospheric pressure to allow the liquid in the casing to so flow and further means are provided for conveying the liquid from the casing to a tank D or other receptacle from which it may be delivered into the working system. In the drawing the means for conveying the liquid from the casing B is shown as a centrifugal pump E connected to the outlet passage A and working in the tank D the pump E having a shaft F extending through an end wall of the tank and carrying a sprocket wheel G connected by an endless chain H with a sprocket I on the shaft J of the power transmission mechanism C.

It is essential to my invention that all places where air might enter the casing be provided with liquid seals or air traps in order that only the liquid from the seal or air trap may be admitted to the casing.

This may be done by making the casing B itself air tight and by providing grooves K around any shaft or other part of the mechanism that projects through the casing and by connecting these grooves by a pipe L with an over head vessel or reservoir M or other part containing the liquid medium, so that the grooves are kept constantly supplied with liquid and the shaft or other part is surrounded by a liquid seal and nothing but liquid can pass into the casing, as will be understood from Figure 2.

It is difficult, however, to maintain the casing absolutely air tight as a slight leak through a joint or a porous portion of the metal is not easy to detect and yet any such leak would reduce, if not destroy, the vacuum in the casing.

I therefore prefer to enclose the casing B, as shown in Figure 1 in a second or outer casing D which is filled with sufficient liquid to immerse the casing B in a liquid bath so that all parts of the casing B are surrounded by liquid.

The outer casing D is provided with stuffing boxes N, N through which the shaft J extends, and such casing serves as a tank or receptacle to receive the liquid expelled from the casing B when the vacuum is formed in the latter. This avoids all possibility of the entry of air into the inner casing B as long as the outer casing D contains sufficient liquid. This outer casing also may act as an expansion vessel and cooling tank.

Any fluid which may leak into the casing B is withdrawn therefrom by the auxiliary pump E into the outer casing D, and any leakage from the working system is made up by the liquid in the casing D through non-return replenishing valves R and R', the liquid being forced, by atmospheric or other pressure, past the valve R or the valve R' to the low pressure port X or Y of the hydraulic system.

The method I employ for removing atmospheric pressure from the casing is to set up an opposing pressure to neutralize it and this necessitates the use of an auxiliary pump.

The auxiliary pump may have its inlet connected to the outlet from the casing and pump directly against atmospheric pressure plus any head of liquid there may be in the system and thus prevent pressure in the casing.

The method I prefer for balancing or neutralizing the atmospheric pressure is to connect the inlet of the pump to the outlet at the lower portion of the casing and to so position the pump relatively to the casing that the liquid from the casing can fall by its own gravity to a level below the part of the casing to be exhausted and flow to the inlet of the pump as shown in Figure 1.

In order to avoid churning, the inlet of the pump must be positioned below the lowest revolving part of the machine.

The auxiliary pump must be capable of delivering against a pressure slightly above atmospheric pressure plus any head of oil, there may be.

The form of auxiliary pump that I prefer for the purpose is a centrifugal type pump run at sufficient speed to deliver against such pressure.

The auxiliary pump E may be driven by means of a sprocket chain H passing over sprocket wheels I and G secured, respectively, to the shaft J and to the shaft of the pump E.

I prefer a centrifugal type pump because it is adapted to deliver varying quantities of liquid against any pressure within its capacity at the speed at which it is run, and the power required to operate such pump varies as the work varies without any complications.

I know of no other pump that will do this except a screw pump driven at a high speed. The centrifugal pump is the cheapest and simplest, being simply a revolving wheel.

Since oil is not lost on account of churning, the apparatus can be run efficiently at high speed and therefore greater power can be developed from any given size machine.

Inasmuch as the oil is outside the casing in which the working parts revolve it is not stirred up and therefore is not heated by churning. It therefore has a higher viscosity and accordingly is less disposed to leak than it would be if it were heated.

Whatever oil may leak into the casing falls into the pump inlet and is discharged to the tank or receptacle for the oil, preferably to the top of the latter, and cool oil of high viscosity is supplied to the replenishing valves or pump suction.

Since there is a lower proportion of leakage, better control can be obtained in a variable capacity machine.

The liquid sealing of all parts where air might otherwise enter avoids all difficulties arising from the entry of air into the working system, and since atmospheric pressure acts on the oil in the seals, and a vacuum exists inside the casing, oil is always being forced through the shaft bearings ensuring good lubrication.

The amount of oil delivered to the system may be deliberately increased and used for cooling and lubricating the shafts.

When the casing is immersed in an outer casing or tank, the joints in the casing need not be made tight as nothing but liquid can enter the casing and this is at once expelled.

What I do claim as my invention and desire to secure by Letters Patent is:—

1. In hydraulic power transmission apparatus, an air tight casing enclosing the operative parts, a gravity fed pump connected to the casing below the operative parts therein and operative to withdraw air and liquid from the casing and thus maintain a vacuum in the casing during the operation of said operative parts, and a tank to receive the liquid withdrawn by said pump from the casing when the vacuum is produced in the latter.

2. In hydraulic power transmission apparatus, a casing enclosing the operative parts, said casing having liquid seals at all places where air might otherwise enter the casing a gravity fed pump connected to the casing below the operative parts therein and operative to withdraw liquid from the casing and maintain a vacuum in the casing during the operation of the mechanism, and a tank to receive the liquid withdrawn from the casing by said pump.

3. In hydraulic power transmission apparatus, a casing enclosing the operative parts, a gravity fed pump connected to the casing below the operative parts and operative to withdraw liquid from the casing and maintain a vacuum in the casing during the operation of the mechanism, a tank communicating with the pump to receive the liquid withdrawn from the casing when the vacuum is produced in the latter, and a liquid containing tank surrounding the casing and in which the casing is immersed to prevent air entering the casing.

In testimony whereof I have hereunto set my hand.

ROBERT FALKLAND CAREY.